United States Patent [19]

Plett

[11] 4,228,764
[45] Oct. 21, 1980

[54] MILKING UNIT SUPPORT AND DETACHER MECHANISM

[75] Inventor: Carl E. Plett, Chino, Calif.

[73] Assignee: Dairy Systems, Inc., Longmont, Colo.

[21] Appl. No.: 902,355

[22] Filed: May 3, 1978

[51] Int. Cl.³ .............................................. A01J 7/00
[52] U.S. Cl. ............................. 119/14.08; 119/14.13
[58] Field of Search ................ 119/14.08, 14.01, 14.1, 119/14.11, 14.12, 14.13, 14.14, 14.15, 14.45

[56] References Cited

U.S. PATENT DOCUMENTS

| | | | |
|---|---|---|---|
| 1,431,389 | 10/1922 | Frisz | 403/93 |
| 2,641,223 | 6/1953 | Van Der Plate | 119/14.14 |
| 2,775,224 | 12/1956 | Rawson et al. | 119/14.13 |
| 3,033,161 | 5/1962 | Babson | 119/14.13 |
| 3,556,053 | 1/1971 | Padman et al. | 119/14.08 |
| 3,603,292 | 9/1971 | Finch | 119/14.1 |
| 3,690,300 | 9/1972 | Tonelli | 119/14.08 |
| 3,789,798 | 2/1974 | Reisgies et al. | 119/14.08 |
| 3,814,056 | 6/1974 | Machans | 119/14.08 |
| 3,861,355 | 1/1975 | Johnson et al. | 119/14.08 |
| 3,893,422 | 7/1975 | Schnitzler et al. | 119/14.08 |
| 3,929,103 | 12/1975 | Schuckbier | 119/14.08 |
| 3,938,470 | 2/1975 | Pace | 119/14.1 |
| 3,973,520 | 8/1976 | Flocchini | 119/14.08 |
| 4,056,077 | 11/1977 | Schluckbier | 119/14.08 |

Primary Examiner—Hugh R. Chamblee
Attorney, Agent, or Firm—Michael, Best & Friedrich

[57] ABSTRACT

A milking unit support and detacher mechanism for supporting a milking unit when the milking unit is attached to a cow for milking. The milking unit support and detacher mechanism includes a milking unit support arm having an end for supporting a milking unit and means for supporting the milking unit support arm for pivotal movement about a generally vertical axis wherein the arm is movable from a rearward position to a forward position. The supporting means includes a generally vertical shaft rotatable about the vertical axis and supporting the support arm. The vertical shaft is supported such that it is freely rotatable about the vertical axis except when the support arm is between the rearward position and the forward position. The supporting means further includes means for biasing the arm forwardly when the arm is in the rearward position and for biasing the arm rearwardly when the arm is in the forward position.

7 Claims, 6 Drawing Figures

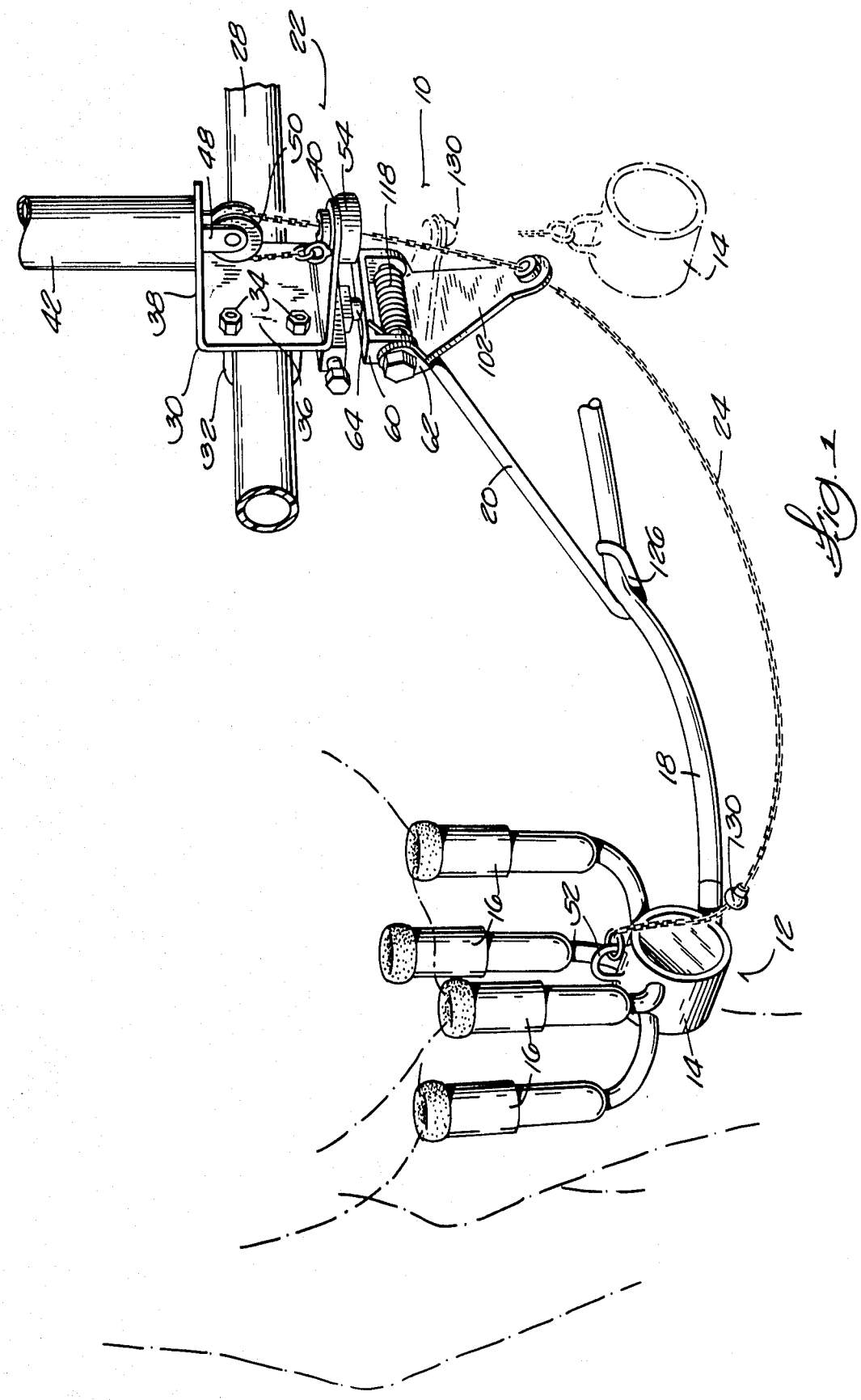

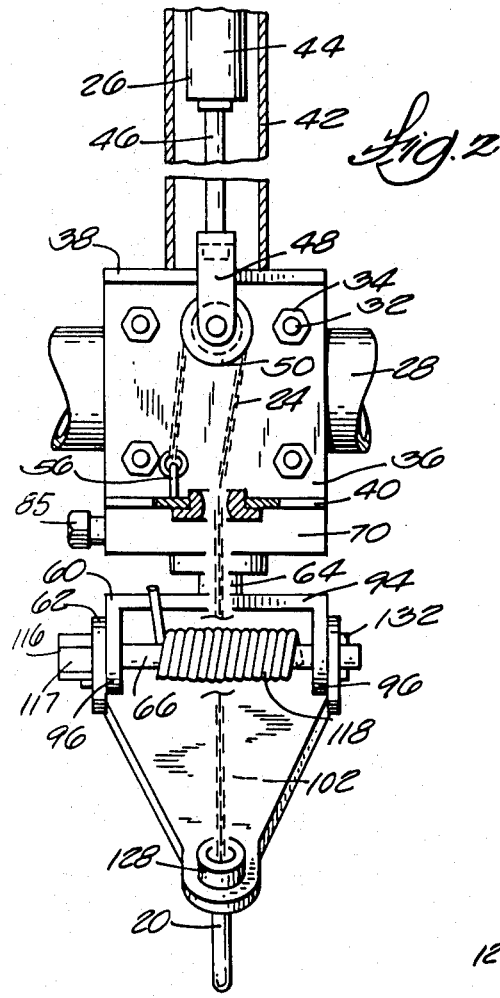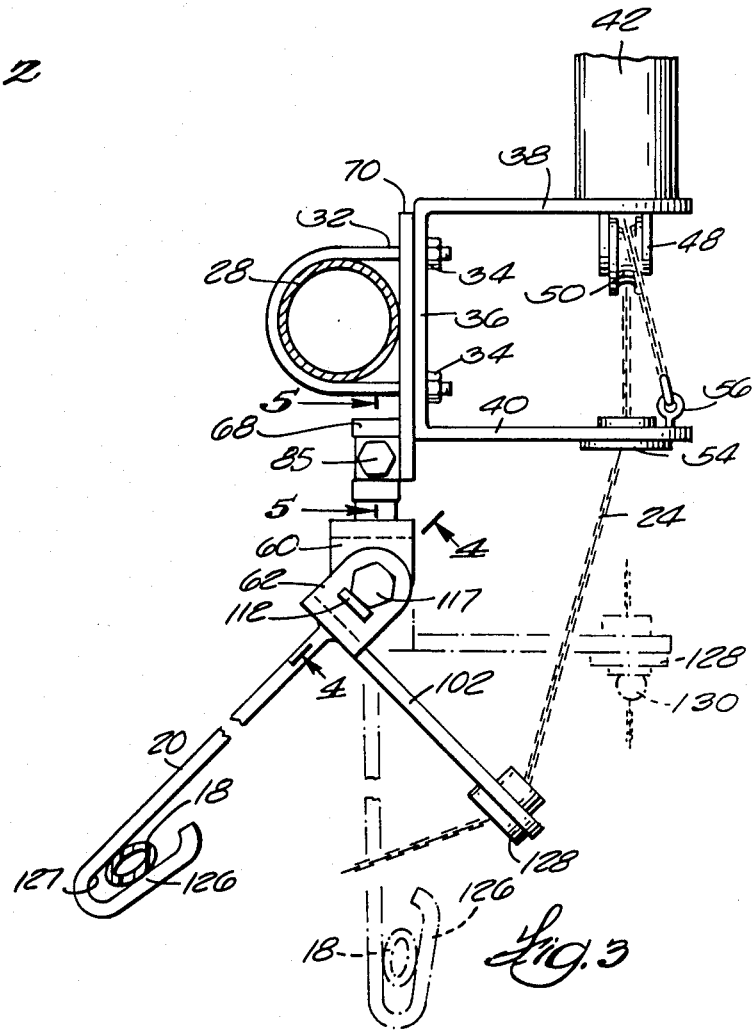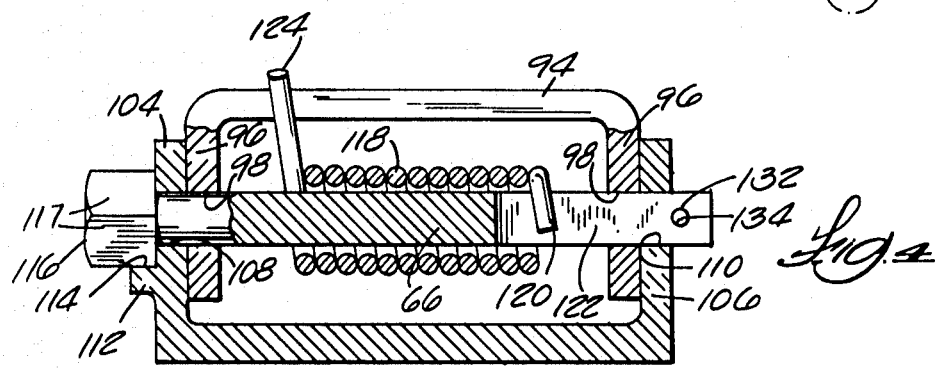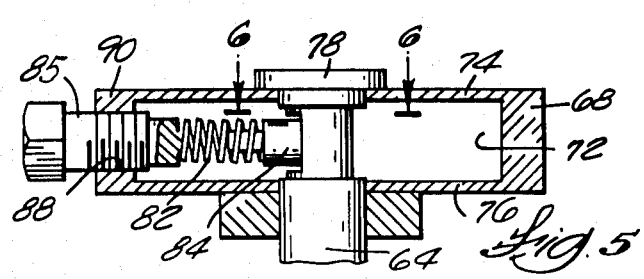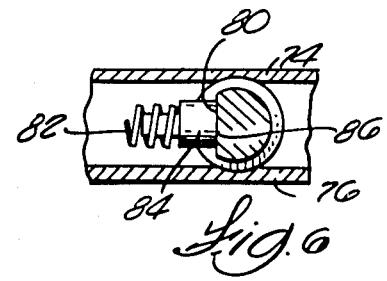

MILKING UNIT SUPPORT AND DETACHER MECHANISM

BACKGROUND OF THE INVENTION

1. Field of the Invention

This invention relates to a milking unit support and detacher mechanism and more particularly to a milking unit support and detacher mechanism having a milking unit support arm which can be spring biased to apply a forward force on a milking unit but which is freely pivotable if subjected to excessive force occurring, for example, if the milking unit is kicked by a cow during milking.

2. Description of the Prior Art

Prior art milking unit support mechanisms of the general type known to applicants are shown in U.S. Pat. Nos. 3,246,631; 3,556,053; 3,603,292; 3,690,300; 3,033,161; 3,789,798; 3,861,355; 3,938,470; 3,814,056 and 3,893,422. One of the principal problems related to such prior art mechanisms has been the relative complexity of such mechanisms resulting in generally higher cost and in some instances lower reliability.

An improved milking unit support and detacher mechanism is shown in U.S. Patent Application Ser. No. 902,354, filed May 3, 1978 by Heidecker et al.

SUMMARY OF THE INVENTION

The present invention provides improvements in the milking unit support and detacher mechanism shown in the Heidecker et al patent application, and more particularly an improved means for supporting the milking unit support arm for pivotal movement.

The present invention includes a milking unit support and detacher mechanism for supporting a milking unit when the milking unit is attached to a cow for milking and including a milking unit support arm having an end for supporting a milking unit, and means for supporting the milking unit support arm for pivotal movement about a generally vertical axis wherein the arm is movable from a rearward position to a forward position. The supporting means includes a generally vertical shaft rotatable about the vertical axis and supporting the support arm. The vertical shaft is freely rotatable about the vertical axis except when the support arm is between the rearward position and the forward position. The supporting means further includes means for biasing the arm forwardly when the arm is in the rearward position and for biasing the arm rearwardly when the arm is in the forward position.

One of the features of the invention is the provision on the generally vertical shaft of a generally vertical planar face and the provision in the biasing means of an engaging member having a generally planar face for engaging the vertical planar face of the vertical shaft when the support arm is between the rearward position and the forward position and means for releasably biasing the engaging member toward the vertical shaft.

Other features and advantages of the embodiments of the invention will become apparent to those skilled in the art from the following description and claims.

BRIEF DESCRIPTION OF THE DRAWINGS

FIG. 1 is a perspective view of a milking unit and a milking unit support and detacher mechanism embodying the invention;

FIG. 2 is a side elevation view of the milking unit support and detacher mechanism shown in FIG. 1;

FIG. 3 is an end elevation view of the milking unit support and detacher mechanism shown in FIG. 1;

FIG. 4 is a cross-section view taken along line 4—4 in FIG. 3;

FIG. 5 is a cross-section view taken along line 5—5 in FIG. 3; and

FIG. 6 is a cross-section view taken along line 6—6 in FIG. 5.

DESCRIPTION OF THE PREFERRED EMBODIMENT

Referring to FIG. 1, the milking unit support and detacher mechanism which is indicated generally by reference numeral 10 is adapted to be used with a milking unit apparatus 12 of any suitable design. The milking unit apparatus 12 shown in FIG. 1 is comprised of a claw unit 14, a plurality of teat cups 16, and a milk line 18.

The milking unit support and detacher mechanism 10 generally comprises a retractable milker unit support arm 20 and a retracting assembly 22 which includes a flexible retracting member 24, shown in FIGS. 1-3 as a chain, and having one end attached to the claw 14 of the milking unit 12. The retracting assembly 22 further includes a fluid motor 26 attached to the other end of the flexible retractable member 24 for retracting the milking unit 12.

The fluid motor 26 is generally supported by the rump rail 28. More particularly, a U-shaped support bracket 30 is attached to the rump rail 28 by a pair of U-bolts 32 and nuts 34. The U-shaped support bracket 30 includes a bight portion 36 oriented generally vertically and rigidly supported adjacent the rump rail 28 and also includes vertically spaced generally parallel bracket arms 38 and 40 extending away from the rump rail 28 and generally perpendicular to the bight portion 36. A cylindrical vertical column 42 is supported by bracket arm 38 and houses the fluid motor 26 therein in vertical orientation.

Referring to FIG. 2, the fluid motor 26 generally includes a cylinder 44 and a piston (not shown) having a downwardly extending piston rod 46, the lower end of the piston rod 46 being attached to the chain 24 and operable to cause retraction of chain 24. More specifically, the lower end of piston rod 46 supports a U-shaped bracket 48 which in turn supports a freely rotatable pulley 50.

The chain 24 has one end attached to the claw 14 by a ring 52. The other end of chain 24 extends through an aperture in a chain guide 54 mounted in a bore in the free end of the lower bracket arm 40 of the support bracket 30 and is reeved over the pulley 50 and secured by an eye bolt 56 to the free end of the lower bracket arm 40.

Actuation of the fluid motor 26 to cause upward movement of the piston rod 46 and consequent upward movement of the pulley 50 causes the chain 24 to be retracted and the milking unit 12 to be pulled away from the milking position and upwardly to the position shown in phantom in FIG. 1. It is necessary that the milking unit 12 be pulled upwardly during the retraction process to prevent contact of the teat cups 16 with the ground.

Though the retracting means described includes a fluid motor with a movable piston, other types of retraction means could also be used, including, for example, a power driven winch or reel.

The retractable milker unit support arm 20 is supported from the support bracket 30 for pivotal movement about both a horizontal pivot axis and a vertical pivot axis. The support arm 20 is also spring biased toward its outwardly extending position wherein its free end projects under the cow in a milking unit support position. The milking unit support arm 20 is intended to support the weight of the milk line 18 and to position the milk line beneath the center of the cow so that the milk line 18 does not tend to pull the claw 14 to the side of the cow. More specifically, the retractable support arm 20 is supported by a pair of pivotal brackets 60 and 62, bracket 60 being supported for rotation about a vertical axis by a pivot shaft 64 in turn supported by the rump rail 28. The bracket 62 is joined to the bracket 60 by a horizontal pivot pin 66 and the bracket 62 is rigidly connected to the retractable support arm 20 for supporting the retractable support arm 20 for pivotal movement about the axis of horizontal pivot pin 66.

The vertical pivot shaft 64 is generally supported by a rectangular housing 68 welded or otherwise rigidly attached to the lower end of a vertical plate 70 clampingly supported between the bight portion 36 of the support bracket 30 and the rump rail 28. The rectangular housing includes a central elongated chamber 72 therein and upper and lower generally horizontal walls 74 and 76, the walls 74 and 76 including aligned bores therethrough for receiving the vertical pivot shaft 64. The pivot shaft 64 is supported by an annular collar 78 surrounding its upper end and received against the upper wall 74.

The portion of the vertical pivot shaft 64 in the chamber 72 includes a vertical planar face 80 and a coil spring 82 biases a cylindrical pin 84 against the planar face 80. The cylindrical pin 84 is housed in chamber 72 and has a longitudinal axis generally perpendicular to the longitudinal axis of the pivot shaft 64. The cylindrical pin 84 has a planar end face 86 intended to mate with the vertical planar face 80 of the pivot shaft 64. The end of the coil spring 82 opposite that received against pin 84 is positioned against spring tension adjustment screw 85 threadably positioned in a threaded bore 88 in an end wall 90 of the housing 68. The pivot shaft 64 is intended to be supported for rotation about its longitudinal axis but is biased toward a neutral position wherein the planar end face 86 of the cylindrical pin 84 is received against planar face 80 of pivot shaft 64. When the vertical pivot shaft 64 rotates, coil spring 82 is compressed and the face 86 of cylindrical pin 84 applies a force on one side or the other of planar face 80 and applies a torque on pivot pin 64 biasing it toward the neutral position wherein the planar face 86 of pin 84 mates with planar face 80 of pivot shaft 64.

The lower end of vertical shaft 64 is rigidly attached to bracket 60 for supporting that bracket for rotation about a vertical axis. The bracket 60 and horizontal pivot pin 66 in turn support the retractable arm support bracket 62 for pivotal movement about a horizontal axis. The bracket 60 includes a horizontal bight portion 94 attached to the pivot shaft 64 and a pair of transverse side walls 96 extending generally downwardly from the bight portion 94. The side walls 96 include aligned bores 98 therethrough for supporting pivot pin 66.

The arm support bracket 62 includes a generally triangular lever arm 102 and a pair of side walls 104 and 106 extending perpendicularly from the plane of the triangular lever arm 102 and extending generally upwardly. The side walls 104 and 106 are positioned in adjacent facing relation to the respective side walls 96, and the side walls 104 and 106 include aligned bores 108 and 110, respectively for receiving pivot pin 66. The side wall 104 includes rectangular stop member 112 projecting from its outer surface, the stop member 112 having an upper planar surface 114. The pivot pin 66 includes a hexagonal head 116 having six planar peripheral surfaces 117, one of which is positioned in planar engagement with the upper surface 114 of the stop member 112, the planar engagement of the upper surface 114 and of the planar surfaces 117 preventing relative rotation between pivot pin 66 and bracket 62.

A coil or torsion spring 118 surrounds pivot pin 66 and includes one end 120 thereof positioned in a longitudinal slot 122 in the end of pivot pin 66. The other end of the coil spring 118 includes a radially projecting arm 124 engaging the bight portion 94 of bracket member 60.

The retractable support arm 20 is rigidly attached at one end to an end of lever arm 102 adjacent pivot pin 66, and the support arm 20 extends generally perpendicularly from the lower surface of the lever arm 102. The other end of arm 20 forms a hook 126 defining a space 127 for wedgingly receiving the milk line 18.

The lever arm 102 of bracket 62 includes a free end spaced from pivot pin 66 and having an aperture therethrough supporting a second chain guide 128. The chain 24 is also provided with a stop member 130 attached thereto at the end of the chain closely adjacent the claw 14. The stop member 130 has a diameter larger than the diameter of the aperture 132 in the chain guide 128. Accordingly, in operation, as the fluid motor 26 causes retraction of chain 24, near the end of the retraction cycle, the stop member 130 will engage the chain guide 128, and further retraction of chain 24 will cause pivotal movement of the lever arm 102 and the arm support bracket 62 about pivot pin 66. Pivotal upward arcuate movement of lever arm 102 will cause a consequent downward arcuate retracting movement of the retractable support arm 20 to the position shown in phantom in FIG. 3.

In operation, milking unit apparatus 12 and the fluid motor 26 are controlled by a four-way solenoid operated valve and milk flow control valve of the type specifically described in the Schluckbier U.S. Pat. No. 3,929,103, issued Dec. 30, 1975. To initiate the milking cycle, the operator grasps the claw 14 of the milking apparatus and actuates the fluid motor control means to cause downward movement of the piston rod 46 thereby permitting extension of the chain 24. The stop member 130 thus moves downwardly permitting the torsion spring 118 to automatically swing the retractable support arm 20 outwardly to the position shown in FIGS. 1 and 3 underneath the cow so that the milk line 18 can be positioned generally under the center of the cow. The operator then attaches the teat cups to the cow.

In some cases it is desirable that the claw 14 be pulled forwardly to facilitate milking of the cow. In such circumstances the retractable arm 20 can be pivoted rearwardly and the milk line 18 wedged in the hook 126. The coil spring 82 and the cylindrical member 84 shown in FIGS. 5 and 6 apply a torque on the vertical pivot shaft 64 biasing the retractable support arm 20 forwardly thereby applying a tension on the milk line 18 and pulling the claw 14 forwardly. Though the retractable support arm 20 can apply a tension on the milk line 18, the force on the arm 20 does not prevent relatively free movement of the arm 20 forwardly or rearwardly in the event the cow moves.

In the event the cow kicks the support arm 20 when the arm is extended, damage to the milking unit support mechanism is avoided because the support arm 20 is freely rotatable about the axis of vertical pivot shaft 64 if sufficient force is applied to the arm 20 to overcome the restraining force of the compression spring 82 and the cylindrical pin 84. The operator can then return the arm 20 to the correct position wherein the planar face 86 of pin 84 will be biased against the planar face 80 of the pivot shaft 64.

The vertical position of the retractable support arm 20 can be adjusted by varying the tension of the torsion spring 118. Such adjustment is provided by removing a restraining pin 132 from a bore 134 in the end of the pivot pin 66 thereby permitting the pivot pin 66 to be moved axially to the left as seen in FIG. 4 such that the hexagonal head 116 is free of the stop member 112. The pivot pin 66 can then be rotated to either increase or decrease the tension of the torsion spring 118 and then moved axially such that one of the planar faces 117 is again positioned in planar engagement with the planar surface 114 of the stop member 112 whereby the pivot pin 66 is restrained against rotational movement.

I claim:

1. A milking unit support mechanism for supporting a milking unit when the milking unit is attached to a cow for milking and comprising:

a milking unit support arm having an end for supporting a milking unit; and means for supporting said milking unit support arm such that said end for supporting said milking unit is releasably held beneath the cow in a first position, said supporting means including means for supporting said support arm for pivotal movement about a generally vertical axis, said supporting means including a generally vertical shaft rotatable about said vertical axis and supporting said support arm and means for biasing said arm forwardly when said arm is pivoted about said vertical axis from said first position toward a position rearwardly of said first position and for biasing said arm rearwardly when said arm is pivoted about said vertical axis from said first position toward a position forward of said first position, said vertical shaft being freely rotatable about said vertical axis except when said arm is between said position rearwardly of said position and said position forward of said first position said generally vertical shaft including a generally vertical planar face and said biasing means including a engaging member having a generally planar face for engaging said vertical planar face when said support arm is in said first position, and means for releasably biasing said engaging member toward said vertical shaft and into engagement with said vertical planar face of said shaft.

2. The milking unit support and detacher mechanism set forth in claim 1 wherein said means for releasably biasing said engaging member toward said vertical shaft includes a spring and means for adjusting the compression of said spring.

3. The milking unit support and detacher mechanism set forth in claim 1 wherein said support arm is movable between a downwardly extending position and an outwardly extending position for supporting a milking unit, and wherein said means for supporting said milking unit support arm includes a first bracket supported by said generally vertical shaft and a second bracket supported by said first bracket for pivotal movement about a horizontal axis, said support arm being attached to said second bracket and movable in an arcuate path from said downwardly extending position to said outwardly extending position during pivotal movement of said second bracket about said horizontal axis.

4. A milking unit support and detacher mechanism for supporting a milking unit when the milking unit is attached to a cow for milking and for retracting the milking unit away from the cow at the completion of the milking cycle, the milking unit support and detacher mechanism comprising:

a milking unit support arm pivotable between a downwardly extending position and an outwardly extending position, said milking unit support arm having an end for supporting a milking unit when the milking unit is attached to a cow for milking and when said arm is in said outwardly extending position, means for supporting said milking unit support arm for pivotal movement about a generally horizontal axis between said downwardly extending position and said outwardly extending position and for supporting said support arm such that said end for supporting said milking unit is releaseably held beneath the cow in a first position, said supporting means including means for supporting said support arm for pivotal movement about a generally vertical axis, said supporting means including a generally vertical shaft rotatable about said vertical axis and supporting said support arm, and including means for biasing said arm forwardly when said arm is pivoted about said vertical axis from said first position toward a position rearwardly of said first position and for biasing said arm rearwardly when said arm is pivoted about said vertical axis from said first position toward a position forward of said first position, said vertical shaft being freely rotatable about said vertical axis except when said arm is between said rearward position and said forward position, and means for retracting said milking unit and for moving said milking unit support arm from said outwardly extending position to said downwardly extending position including a flexible retracting member connected to the milking unit, and means for pulling said flexible retracting member.

5. The milking unit support and detacher mechanism set forth in claim 3 wherein said generally vertical shaft includes a generally vertical planar face and wherein said biasing means includes an engaging member having a generally planar face for engaging said vertical planar face when said support arm is in said first position, and means for releasably biasing said engaging member toward said vertical shaft and into engagement with said vertical planar face of said shaft.

6. The milking unit support and detacher mechanism set forth in claim 5 wherein said means for releasably biasing said engaging member toward said vertical shaft includes a spring and means for adjusting the compression of said spring.

7. The milking unit support and detacher mechanism set forth in claim 4 wherein said means for supporting said milking unit support arm includes a first bracket supported by said generally vertical shaft and a second bracket supported by said first bracket for pivotal movement about a horizontal axis, said support arm being attached to said second bracket and movable in an arcuate path from said downwardly extending position to said outwardly extending position during pivotal movement of said second bracket about said horizontal axis.

* * * * *

UNITED STATES PATENT AND TRADEMARK OFFICE
CERTIFICATE OF CORRECTION

PATENT NO. : 4,228,764
DATED : October 21, 1980
INVENTOR(S) : Carl E. Plett

It is certified that error appears in the above–identified patent and that said Letters Patent are hereby corrected as shown below:

Column 6, Line 53, Claim 5, delete the numeral "3" and substitute therefor ---4---

Signed and Sealed this

Seventh Day of April 1981

[SEAL]

Attest:

RENE D. TEGTMEYER

Attesting Officer     Acting Commissioner of Patents and Trademarks